(12) United States Patent
Olkkonen et al.

(10) Patent No.: US 11,067,733 B2
(45) Date of Patent: Jul. 20, 2021

(54) WAVEGUIDE DISPLAY ELEMENT WITH AN INTERMEDIATE LAYER BETWEEN AN IN-COUPLING GRATING AND A WAVEGUIDE

(71) Applicant: DISPELIX OY, Espoo (FI)

(72) Inventors: Juuso Olkkonen, Espoo (FI); Kasimir Blomstedt, Espoo (FI)

(73) Assignee: DISPELIX OY, Espoo (FI)

( * ) Notice: Subject to any disclaimer, the term of this patent is extended or adjusted under 35 U.S.C. 154(b) by 0 days.

(21) Appl. No.: 17/041,292

(22) PCT Filed: Mar. 22, 2019

(86) PCT No.: PCT/FI2019/050240
§ 371 (c)(1),
(2) Date: Sep. 24, 2020

(87) PCT Pub. No.: WO2019/185989
PCT Pub. Date: Oct. 3, 2019

(65) Prior Publication Data
US 2021/0116622 A1  Apr. 22, 2021

(30) Foreign Application Priority Data

Mar. 28, 2018  (FI) ..................................... 20185292

(51) Int. Cl.
*G02B 27/01*  (2006.01)
*F21V 8/00*  (2006.01)

(52) U.S. Cl.
CPC .......... *G02B 6/0016* (2013.01); *G02B 6/005* (2013.01); *G02B 6/0076* (2013.01); *G02B 27/0101* (2013.01); *G02B 2027/0114* (2013.01)

(58) Field of Classification Search
CPC .... G02B 6/0016; G02B 6/005; G02B 6/0076; G02B 6/00; G02B 27/0101; G02B 27/42; G02B 27/01; G02B 27/44; G02B 27/0172; G02B 27/4272; G02B 2027/0114; G02B 5/18; G02B 5/1819; G02B 5/1823; G02B 5/1828
See application file for complete search history.

(56) References Cited

U.S. PATENT DOCUMENTS

| 8,659,813 | B2 * | 2/2014 | Davis ........................ G02F 1/29 |
| | | | 359/238 |
| 10,747,001 | B2 * | 8/2020 | Schultz ............. G02B 27/0172 |
| 2004/0038386 | A1 * | 2/2004 | Zesch .................. G01N 21/648 |
| | | | 435/287.2 |
| 2006/0008206 | A1 * | 1/2006 | Maisenhoelder ...... G02B 6/136 |
| | | | 385/37 |

(Continued)

*Primary Examiner* — Andrew Jordan
(74) *Attorney, Agent, or Firm* — Maschoff Brennan

(57) ABSTRACT

A waveguide display element includes waveguide layers stacked on top of each other and an in-coupler associated with each waveguide layer for coupling light within a predefined wavelength band into the waveguide layer. Each of the in-couplers includes an intermediate layer arranged on the waveguide layer, the intermediate layer having intermediate layer properties. Each of the in-couplers further includes an in-coupling grating arranged on the intermediate layer, the grating having grating properties. The combination of the intermediate layer properties and grating properties of each in-coupler is different with respect to other in-couplers.

20 Claims, 3 Drawing Sheets

(56) References Cited

U.S. PATENT DOCUMENTS

| | | | |
|---|---|---|---|
| 2013/0051730 A1* | 2/2013 | Travers | G02B 27/4272 385/37 |
| 2017/0235142 A1* | 8/2017 | Wall | G02B 5/26 359/633 |
| 2018/0031752 A1* | 2/2018 | Ferrini | G02B 6/0016 |
| 2019/0011708 A1* | 1/2019 | Schultz | G02B 27/0172 |
| 2020/0081246 A1* | 3/2020 | Olkkonen | G02B 5/1823 |
| 2020/0333614 A1* | 10/2020 | Blomstedt | G02B 5/1828 |
| 2020/0393674 A1* | 12/2020 | Blomstedt | G02B 6/0016 |
| 2021/0080628 A1* | 3/2021 | Blomstedt | G02B 27/4272 |
| 2021/0109347 A1* | 4/2021 | Blomstedt | G02B 27/4272 |
| 2021/0116622 A1* | 4/2021 | Olkkonen | G02B 27/0101 |
| 2021/0124170 A1* | 4/2021 | Lee | G02B 6/0035 |

\* cited by examiner

WAVEGUIDE DISPLAY ELEMENT WITH AN INTERMEDIATE LAYER BETWEEN AN IN-COUPLING GRATING AND A WAVEGUIDE

FIELD OF THE INVENTION

The invention relates to diffractive display technology. In particular, the invention relates to in-coupling arrangements of waveguide-based diffractive display waveguides. Such waveguides can be used in personal displays, such as head-mounted displays (HMDs), for example near-to-eye displays (NEDs), and head-up displays (HUDs).

BACKGROUND OF THE INVENTION

HMDs and HUDs can be implemented using waveguide technology. Light can be coupled to a waveguide, redirected therein and coupled out of the waveguide using diffraction gratings. In a multicolour display, all colour components (wavelengths) can be guided in a single waveguide layer or in different layers. In one known waveguide design, the waveguide comprises a plurality of layers stacked on top of each other and each layer is designed to guide a different wavelength band. Selection of the wavelength band coupled to each layer can be made by separating in-coupling gratings laterally to different locations of the waveguide stack or by using suitably polarized light and polarization-sensitive in-coupling gratings. The former way complicates the light projection arrangement, while the latter one is non-optimal because the polarization sensitivity of gratings is not very high even at best.

Thus, there is a need for improved in-coupling arrangements.

SUMMARY OF THE INVENTION

It is an aim of the invention to provide an improved wavelength-sensitive in-coupler for waveguide-based displays.

The aim is achieved by the what is stated in the independent claims.

The invention is based on the idea that with laser light having short enough wavelength band the angles of input rays incident on a waveguide can be different than the angles of output rays. With wide bandwidth illumination, the angles of input and output in respect of the lightguide surface normal needs to be always the same, otherwise the image resolution is lost. Thus, with laser projector, the primary colors (R,G,B) can be injected on the in-coupling region so that that the primary colors are angularly separated or partially overlapping. With a three-layer waveguide stack, in which each primary color propagates in the own waveguide, the present invention can be used to in-couple light without any cross-coupling between the colors.

Thus, according to one aspect, there is provided a waveguide display element comprising a plurality of waveguide layers stacked on top of each other and an in-coupler associated with each waveguide layer for coupling light within a predefined wavelength band into the waveguide layer. Each of the in-couplers comprise an intermediate layer arranged on the waveguide layer, the intermediate layer having intermediate layer properties, and an in-coupling grating arranged on the intermediate layer, the grating having grating properties. The combination of intermediate layer properties and grating properties of each in-coupler is different with respect to other in-couplers.

According to another aspect, there is provided a personal display device, such as a head-mounted display (HMD) or head-up display (HUD), comprising a waveguide display element of the above kind and a multicolor laser projector adapted to project light rays in different ingles of incidence to in-couplers of the display element.

Further, there is provided a method of coupling propagating light rays into a waveguide display, the method comprising providing a waveguide display element the above kind and directing laser light rays in different angles of incidence to the display element in order to selectively couple said rays into the different waveguide layers of the display element.

The invention offers significant benefits. Choosing the properties of the intermediate layers and the in-coupling gratings so that they differ from each other between the different layers, allows for efficiently coupling different wavelengths to different waveguide layers using different angles of incidence.

Put another way, the thin low refractive index layer provided between the waveguide layer and the in-coupling grating between the in-coupling arrangement becomes angle sensitive so that color separation to different layers is possible.

Compared with polarization-based color separation, the present invention provides higher coupling efficiency, which increases brightness and/or allows for reducing power consumption.

Also, the angle in which different colors are diffracted, can be controlled better than using prior solutions and in particular when a single waveguide layer is used. For example, with the present invention, the hop length of light rays in each layer, i.e. the distance between successive total internal reflections at a single surface of the waveguide, can be kept short. This allows for better control of colors and reduces striping in out-coupling.

Compared to laterally separated in-coupling regions and also polarization-sensitive gratings, the structure according to the structure according to the present invention is simple to manufacture. Basically, only one additional thin-film layer of low refractive index material is required between the main waveguide layer and the grating, and suitable adjustment of properties of the thin-film layers and the gratings, is required.

The dependent claims are directed to selected embodiments of the invention.

In some embodiments the different combination of layer properties is achieved at least partially so that the in-couplers have the same intermediate layer properties and different grating properties with respect to other in-couplers.

In some embodiments the different combination of layer properties is achieved at least partially so that in-couplers associated with different waveguide layers have different in-coupling grating periods. For example, the grating period may increase from a top waveguide layer on the incoming light side of the element towards a bottom waveguide layers on the opposite side of the element.

In some embodiments the different combination of layer properties is achieved at least partially so that the in-couplers have the same grating properties and different intermediate layer properties with respect to other in-couplers. There may be provided one or more optical bandpass filters or dichroic mirrors between the waveguide layers.

In some embodiments each intermediate layer has a thickness and index of refraction smaller than that of the waveguide layer it is associated with.

In some embodiments the intermediate layers of each in-coupler have a thickness of 20 μm or less, in particular 10 μm or less, such as 1-10 μm.

In some embodiments the waveguide layers have an index of refraction which is 1.7 or more, such as 2.0 or more, and the intermediate layers have an index of refraction which is less than 1.8, such as 1.7 or less.

In some embodiments the in-couplers have the same shape and are aligned with each other in the lateral plane of the element.

Next, embodiments of the invention and advantages thereof are discussed in more detail with reference to the attached drawings.

DETAILED DESCRIPTION OF EMBODIMENTS

Figure 1:
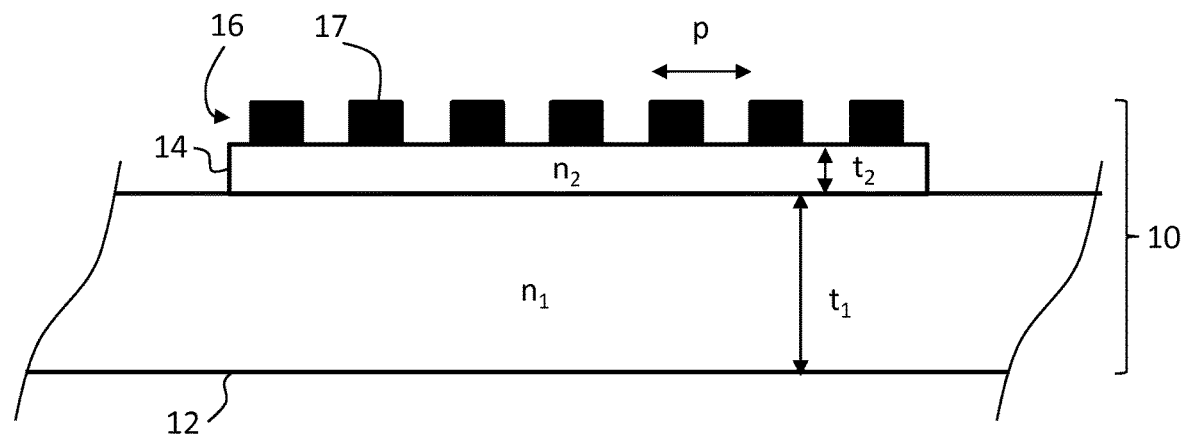
FIG. 1 shows a cross-sectional detail side view of a single waveguide layer and in-coupler arranged thereon.

FIG. 1 shows a section of a planar waveguide layer 12 having an index of refraction $n_1$ and thickness of $t_1$. The waveguide layer 12 is made of transparent material and allows light rays to propagate therein laterally via total internal reflections. On a top surface of the waveguide layer 12, there is an intermediate layer 14 having an index of refraction $n_2$ and thickness of $t_2$.

On top of the intermediate layer, there is an in-coupling grating 16 which comprises periodically arranged grating features 17. The grating can be a one-dimensional grating, i.e. a line grating having a single period p, or a two-dimensional grating having two main periods in different directions (whereby references to "period" herein apply to either of the periods). A binary grating is shown in FIG. 1, but the grating profile may be any. Other examples include blazed gratings and slanted gratings.

The waveguide layer 12, the intermediate layer 14 and the grating 16 together form a color/angle-sensitive layer entity 10.

In general, $n_2 < n_1$ and $t_2 < t_1$. Typically, $t_2 \ll t_1$.

In one example, $n_1 = 1.5 \ldots 2.5$. Preferably, $n_1 \geq 1.7$, such as 2.0.

In one example, $n_2 = 1.1 \ldots 1.8$. Preferably, $n_2 \leq 1.7$.

In one example, $t_2 < t_1/10$. Typically, $t_2 < t_1/20$.

In one example, $t_1 = 0.2 \ldots 1.2$ mm, such as $0.3 \ldots 0.7$ mm.

In one example, $t_2 = 0.5 \ldots 50$ μm. Typically, $t_2 = 1 \ldots 20$ μm.

Figure 2:
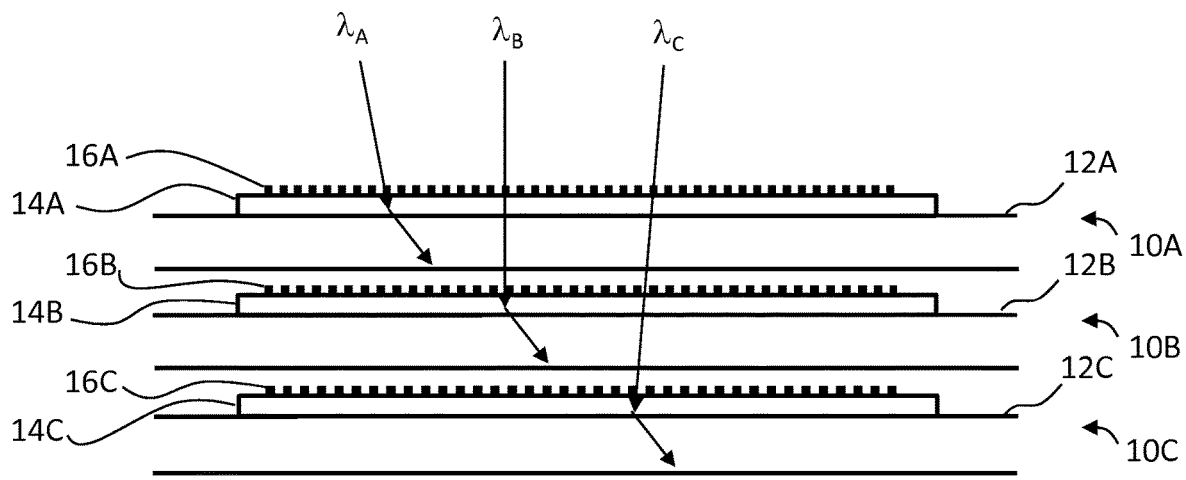
FIG. 2 shows a cross-sectional side view of a stack of three waveguide layers and in-couplers provided thereon.

FIG. 2 shows three superimposed layer entities 10A-C, i.e. waveguide layers 12A-C and intermediate layers 14A-C and in-coupling gratings 16A-C arranged thereon, respectively. In one example, all waveguide layers 12A-C and intermediate layers 14A-C are essentially identical, but the periods of the in-coupling gratings 16A-C differ from each other. This causes different wavelengths $\lambda_A, \lambda_B, \lambda_C$ directed to the stack at different angles, to selectively couple to different waveguide layers 12A-C, respectively, as propagating waves.

In one example, the period of the second grating 16B is longer then the period of the first grating 16A and the period of the third grating 16C is longer than the period of the second grating 16B.

The periods of the neighboring in-coupling gratings 16A/16B, 16B/16C can differ e.g. by 100-400 nm. In one example, the period of the first grating 16A is 200-300 nm, the period of the second grating 16B is 350-450 nm and the period of the third grating 16C is 750-850 nm.

The above embodiments allow for keeping diffraction angles of all wavelengths arriving at the element low with respect to the angle of incidence, whereby the hop length of light rays remains short.

Figure 3A:
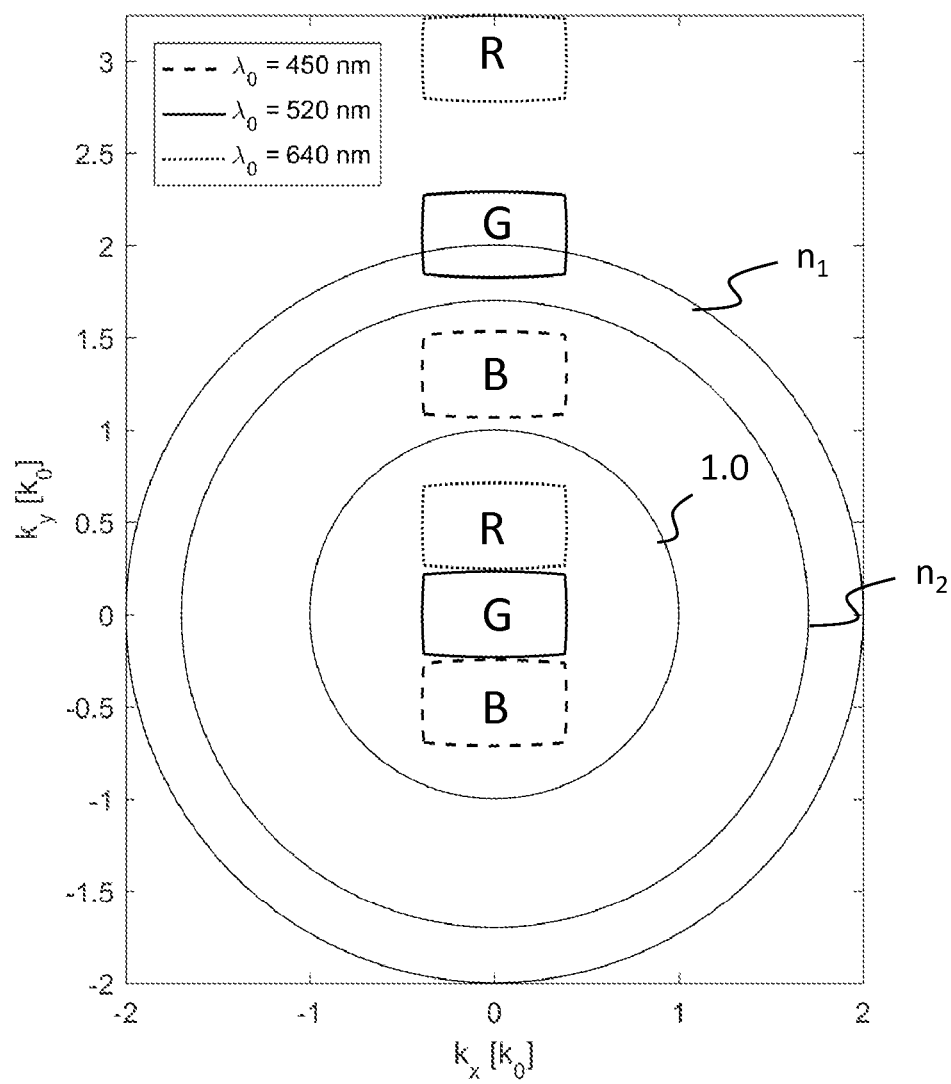
FIGS. 3A and 3B shows wave vector diagram for the first and second in-couplers of a stack of three waveguides, respectively.
Figure 3B:
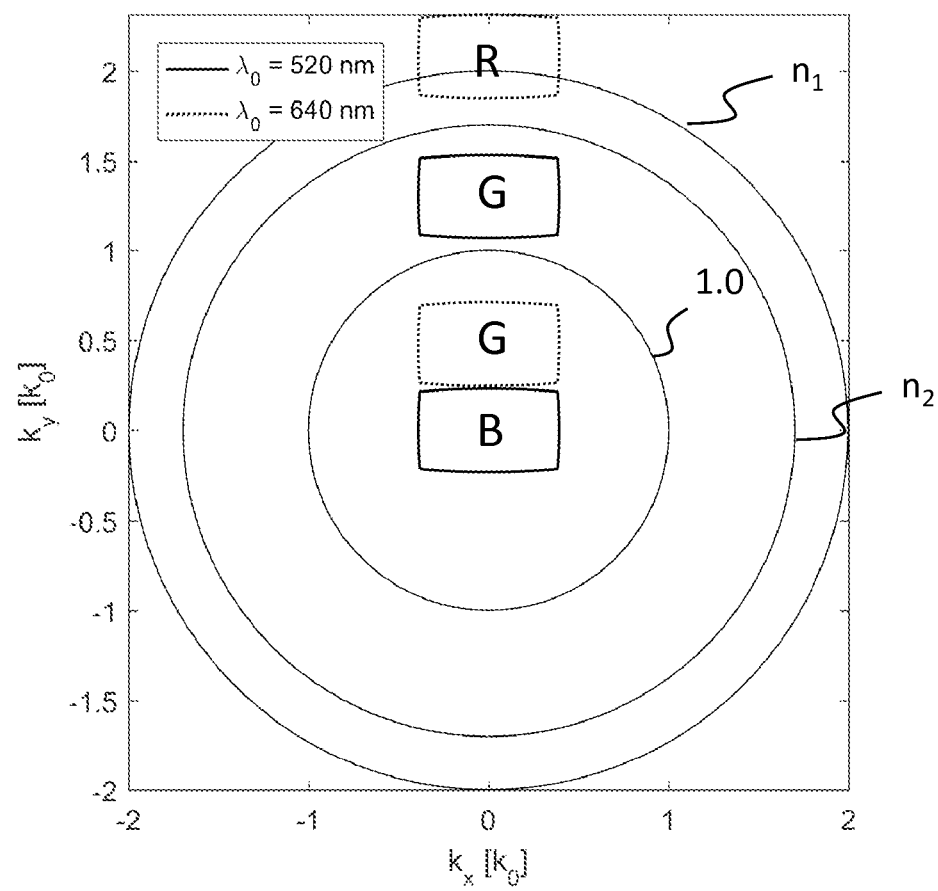

FIG. 3A shows the wave vector diagram in the $(k_x, k_y)$ plane for the first in-coupler of a stack of three waveguides. The primary colors (blue, green, red) are incident at non-overlapping angles on the in-coupling grating (the three central FOV boxes). Also partially overlapping configuration is possible. The image has diagonal field of view of 52 deg with 16:9 aspect ratio. Here, $n_1 = 2.0$, $n_2 = 1.7$ for all waveguides. The first diffraction order of the in-coupling grating moves the FOV boxes along the y-direction from center to upwards. The FOV points inside the annulus, defined by the inner radius 1.0 and the outer radius $n_2$, represent modes that propagate inside the main waveguide via total internal reflection. The FOV points outside the $n_1$-circle are forbidden modes that never exist. It can be seen that only blue light in-couples to the $1.0/n_2$-annulus. When the $n_2$-layer below the in-coupling gratin is thick enough, no transmissive diffraction take place into the $n_1/n_2$-annulus and thus the green image does not in-couple. After the first waveguide, a long pass filter can be used to remove the blue light, and thus the in-coupler of the second lightguide receives only green and red light. The wave vector diagram for the in-coupler of the second lightguide is shown in FIG. 3B. After the second lightguide, the green light is removed by a bandpass filter. The last guide receive only red light and thus conventional in-couplers can be used for it. Instead of band-bass absorbers, also dichroic mirrors or other wavelength selective components can be used.

The waveguide layers can be planar pieces of transparent material, typically plastic or glass, having two parallel main surfaces. The intermediate layers are also transparent and typically plastic or glass layers. In one example, the intermediate layers are provided as coating layers. The gratings can be fabricated for example as surface relief gratings (SRGs) or by providing additional material onto the surface as diffractive features, or other diffractive optical elements (DOEs). In one example, the gratings comprise linear features made of at least one oxide or nitride material, such as $TiO_2$, $Si_3N_4$, and $HfO_2$.

The invention claimed is:

1. A waveguide display element comprising:
   a plurality of waveguide layers stacked on top of each other, and
   an in-coupler associated with each waveguide layer for coupling light within a predefined wavelength band into the waveguide layer,
   wherein:
      each of the in-couplers includes:
         an intermediate layer arranged on the waveguide layer, the intermediate layer having intermediate layer properties, and
         an in-coupling grating arranged on the intermediate layer, the grating having grating properties, and
      the combination of intermediate layer properties and grating properties of each in-coupler is different with respect to other in-couplers.

2. The element according to claim 1, wherein the in-couplers have the same intermediate layer properties and different grating properties with respect to other in-couplers.

3. The element according to claim 2, wherein in-couplers associated with different waveguide layers have different in-coupling grating periods.

4. The element according to claim 3, wherein the grating period increases from a top waveguide layer on the incoming light side of the element towards a bottom waveguide layers on the opposite side of the element.

5. The element according to claim 2, wherein the grating period increases from a top waveguide layer on the incoming light side of the element towards a bottom waveguide layers on the opposite side of the element.

6. The element according to claim 2, wherein the intermediate layers of each in-coupler have a thickness of 20 μm or less, in particular 10 μm or less, such as 1-10 μm.

7. The element according to claim 2, wherein:
the waveguide layers have an index of refraction which is 1.7 or more, such as 2.0 or more, and the intermediate layers have an index of refraction which is less than 1.8, such as 1.7 or less.

8. The element according to claim 2, wherein the in-couplers have the same shape and are aligned with each other in the lateral plane of the element.

9. The element according to claim 1, wherein in-couplers associated with different waveguide layers have different in-coupling grating periods.

10. The element according to claim 9, wherein the grating period increases from a top waveguide layer on the incoming light side of the element towards a bottom waveguide layers on the opposite side of the element.

11. The element according to claim 9, wherein the grating period increases from a top waveguide layer on the incoming light side of the element towards a bottom waveguide layers on the opposite side of the element.

12. The element according to claim 1, wherein the in-couplers have the same grating properties and different intermediate layer properties with respect to other in-couplers.

13. The element according to claim 12, further comprising one or more optical bandpass filters or dichroic mirrors between the waveguide layers.

14. The element according to claim 1, wherein the intermediate layers of each in-coupler have a thickness of 20 μm or less, in particular 10 μm or less, such as 1-10 μm.

15. The element according to claim 1, wherein:
the waveguide layers have an index of refraction which is 1.7 or more, such as 2.0 or more, and
the intermediate layers have an index of refraction which is less than 1.8, such as 1.7 or less.

16. The element according to claim 1, wherein the in-couplers have the same shape and are aligned with each other in the lateral plane of the element.

17. A personal display device, such as a head-mounted display or head-up display, comprising:
a waveguide display element according to claim 1, and
a multicolor laser projector adapted to project light rays in different angles of incidence to in-couplers of the display element.

18. A method of coupling propagating light rays into a waveguide display, comprising:
providing a waveguide display element according to claim 1, and
directing light rays in different angles of incidence to the display element in order to selectively couple said rays into the different waveguide layers of the display element.

19. The method according to claim 18, wherein said light rays comprise light rays in at least three different wavelength bands, each of the wavelength bands being directed to the display element in a different angle of incidence.

20. The element according to claim 1, wherein each intermediate layer has a thickness and index of refraction smaller than that of the waveguide layer it is associated with.

* * * * *